United States Patent
Tsai

(10) Patent No.: US 9,356,524 B2
(45) Date of Patent: May 31, 2016

(54) POWER CONVERSION APPARATUS

(71) Applicant: FSP TECHNOLOGY INC., Taoyuan County (TW)

(72) Inventor: Chien-Li Tsai, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 14/561,177

(22) Filed: Dec. 4, 2014

(65) Prior Publication Data

US 2015/0180353 A1    Jun. 25, 2015

(30) Foreign Application Priority Data

Dec. 19, 2013   (TW) .............................. 102147217 A

(51) Int. Cl.
*H02M 3/335* (2006.01)
*H02M 1/42* (2007.01)

(52) U.S. Cl.
CPC ........ *H02M 3/33515* (2013.01); *H02M 1/4208* (2013.01); *H02M 3/33523* (2013.01); *Y02B 70/126* (2013.01)

(58) Field of Classification Search
CPC ...................... H02M 3/33523; H02M 3/33515; H02M 1/4208

USPC ....................................................... 363/21.01
See application file for complete search history.

(56) References Cited

U.S. PATENT DOCUMENTS 5,349,523 A * 9/1994 Inou .................. H02M 3/33515
                                                363/21.05
6,385,061 B1 * 5/2002 Turchi ..................... H02M 1/34
                                                323/902

* cited by examiner

*Primary Examiner* — Adolf Berhane
*Assistant Examiner* — Afework Demisse
(74) *Attorney, Agent, or Firm* — Jianq Chyun IP Office

(57) ABSTRACT

A power conversion apparatus, including a transformer, a switch, an analog controller, a digital controller, and a voltage converter-based feedback circuit, is provided. The primary side of the transformer is coupled to an input voltage, and the secondary side of the transformer is coupled to an output voltage provided to a load. The switch intermittently transmits the input voltage to the primary side of the transformer. The analog controller is disposed at one of the primary side and the secondary side of the transformer and configured to control the operation of the switch in response to an analog feedback signal. The digital controller is disposed at the other one of the primary side and the secondary side and configured to generate a digital feedback signal. The voltage converter-based feedback circuit is configured to convert the digital feedback signal to the analog feedback signal based on a voltage conversion characteristic thereof.

10 Claims, 3 Drawing Sheets

POWER CONVERSION APPARATUS

CROSS-REFERENCE TO RELATED APPLICATION

This application claims the priority benefit of Taiwan application serial no. 102147217, filed on Dec. 19, 2013. The entirety of the above-mentioned patent application is hereby incorporated by reference herein and made a part of this specification.

BACKGROUND OF THE INVENTION

1. Field of the Invention

The invention relates to a power conversion apparatus and particularly relates to a power conversion apparatus that utilizes a voltage conversion characteristic to achieve a digital to analog conversion signal feedback mechanism.

2. Description of Related Art

Power conversion apparatuses are used mainly for converting high-voltage and lowly-stable AC input power, supplied by the power company, to low-voltage and highly-stable DC output power that is suitable for various electronic devices. Therefore, power conversion apparatuses are widely used in electronic devices, such as computers, office automation equipment, industrial control equipment, and communication equipment.

The conventional power conversion apparatus is usually provided with a power factor correction (PFC) circuit in the front-end stage for providing a constant DC input voltage (up to 380V for example) to a DC-to-DC conversion circuit in the back-end stage. No matter the power conversion apparatus is in the state of light load or heavy load, the PFC circuit provides constant high voltage (380V) to the DC-to-DC conversion circuit in the back-end stage. Thus, under the principle of constant power, power loss of the power conversion apparatus during light load increases (compared with heavy load), which lowers the overall conversion efficiency of power conversion apparatus.

In view of the above, a power conversion apparatus with a feedback control mechanism has been proposed, which allows the controller that controls the front-end stage PFC circuit to adjust the output voltage of the PFC circuit according to the operation status of the load, so as to improve the conversion efficiency. In the power conversion configuration with the feedback control mechanism, the controller that controls the back-end stage DC-to-DC conversion circuit needs to feed information associated with the operation status of the load back to the front-end stage controller.

If the back-end stage controller and the front-end stage controller are a digital circuit and an analog circuit respectively, a (chip type) digital-to-analog converter (DAC) is required to be disposed between the two controllers for performing digital to analog conversion, so as to feed the information associated with the operation status of the load from the back-end stage controller back to the front-end stage controller. However, due to limitation of the conversion characteristic of the general (chip type) digital-to-analog converter, the digital signal outputted by the back-end stage controller cannot be converted to a proportional analog signal through the digital-to-analog conversion. For this reason, an additional digital to analog converter needs to be disposed, which raises the design costs of the power conversion apparatus.

SUMMARY OF THE INVENTION

The invention provides a power conversion apparatus that achieves a digital to analog conversion signal feedback mechanism without using a (chip type) digital-to-analog converter.

The power conversion apparatus of the invention includes a transformer, a switch, an analog controller, a digital controller, and a voltage converter-based feedback circuit. The transformer has a primary side and a secondary side. The primary side of the transformer is coupled to an input voltage, and the secondary side of the transformer is coupled to an output voltage that is provided to a load. The switch is configured to intermittently transmit the input voltage to the primary side of the transformer. The analog controller is disposed at one of the primary side and the secondary side of the transformer. The analog controller is coupled to the switch and configured to control an operation of the switch in response to an analog feedback signal. The digital controller is disposed at the other one of the primary side and the secondary side of the transformer and configured to generate a digital feedback signal. The voltage converter-based feedback circuit is coupled to the analog controller and receives the digital feedback signal, and is configured to convert the digital feedback signal to the analog feedback signal according to a voltage conversion characteristic thereof.

In an embodiment of the invention, the voltage converter-based feedback circuit determines a voltage level of the analog feedback signal according to a product of a duty cycle of the digital feedback signal and a reference voltage.

In an embodiment of the invention, the voltage converter-based feedback circuit includes a photo-coupler, a voltage converter, and an isolated output circuit. The photo-coupler has an input side and an output side, wherein the input side of the photo-coupler is coupled to the digital controller to receive the digital feedback signal. The voltage converter is coupled to the output side of the photo-coupler and configured to perform a voltage conversion on the reference voltage according to the digital feedback signal coupled to the output side and generate an analog output signal accordingly. The isolated output circuit is coupled between the voltage converter and the analog controller and configured to provide the analog feedback signal to the analog controller according to the analog output signal.

In an embodiment of the invention, the voltage converter includes a first diode, an inductor, a capacitor, and a first resistor. A cathode end of the first diode is coupled to the output side and an anode end of the first diode is coupled to a ground end. A first end of the inductor is coupled to the cathode end of the first diode. A first end of the capacitor is coupled to a second end of the inductor and a second end of the capacitor is coupled to the ground end. A first end of the first resistor is coupled to the second end of the inductor and the first end of the capacitor, and a second end of the first resistor is coupled to the ground end.

In an embodiment of the invention, the isolated output circuit includes a second diode. An anode end of the second diode is coupled to an output end of the voltage converter to receive the analog output signal, and a cathode end of the second diode is coupled to the analog controller to provide the analog feedback signal.

In an embodiment of the invention, the isolated output circuit includes a bias resistor and a transistor. A first end of the bias resistor receives a bias voltage. A control end of the transistor is coupled to the output end of the voltage converter to receive the analog output signal, a first end of the transistor is coupled to the analog controller and a second end of the bias resistor to provide the analog feedback signal, and a second end of the transistor is coupled to the ground end.

In an embodiment of the invention, the isolated output circuit includes a current mirror and a dividing circuit. The current minor is coupled to the output end of the voltage converter and generates a minor current in response to the analog output signal. The dividing circuit is coupled to the current mirror to generate the analog feedback signal according to the mirror current.

In an embodiment of the invention, the minor current and a voltage level of the analog output signal have a positive correlation, and the mirror current and the voltage level of the analog feedback signal have a negative correlation.

In an embodiment of the invention, the current minor includes a second resistor, a first transistor, a second transistor, a third resistor, and a fourth resistor. A first end of the second resistor is coupled to the output end of the voltage converter. A control end and a first end of the first transistor are both coupled to a second end of the second resistor. A control end of the second transistor is coupled to the control end of the first transistor and a first end of the second transistor is coupled to the dividing circuit. A first end of the third resistor is coupled to a second end of the first transistor and a second end of the third resistor is coupled to the ground end. A first end of the fourth resistor is coupled to a second end of the second transistor and a second end of the fourth resistor is coupled to the ground end.

In an embodiment of the invention, the dividing circuit includes a fifth resistor and a sixth resistor. A first end of the fifth resistor receives a bias voltage and a second end of the fifth resistor is coupled to the analog controller. A first end of the sixth resistor is coupled to the second end of the fifth resistor and a second end of the sixth resistor is coupled to the first end of the second transistor.

In an embodiment of the invention, the power conversion apparatus further includes an electromagnetic interference filter, a rectification circuit, and a power factor correction circuit. The electromagnetic interference filter receives an AC voltage and is configured to suppress electromagnetic noise of the AC voltage. The rectification circuit is coupled to the electromagnetic interference filter and configured to rectify the AC voltage after noise suppression to generate the input voltage. The power factor correction circuit is configured to perform a power factor correction on the input voltage associated with the AC voltage, wherein the switch is disposed in the power factor correction circuit to control an operation of the power factor correction circuit.

Based on the above, the power conversion apparatus of the embodiments of the invention utilizes the voltage conversion characteristic of the feedback circuit to convert the digital feedback signal, generated by the digital controller at the secondary side and associated with the load operation status, to the analog feedback signal and provide the same to the analog controller at the primary side, such that the analog controller can control the power factor correction circuit based on the analog feedback signal. With this configuration, the digital to analog conversion of the feedback signal is achieved without using a (chip type) digital to analog converter. Therefore, the accuracy of signal feedback is effectively improved and the overall circuit configuration of the power conversion apparatus is further simplified.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
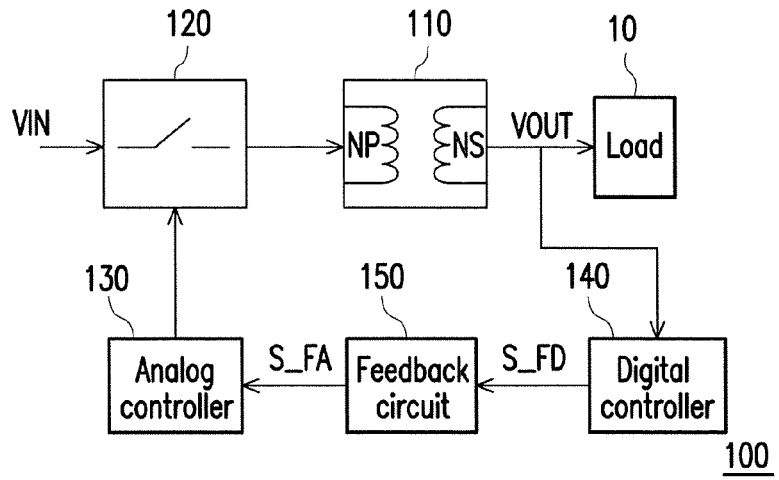
FIG. 1 is a schematic diagram illustrating a power conversion apparatus according to an embodiment of the invention.

An embodiment of the invention provides a power conversion apparatus that achieves a digital to analog conversion signal feedback mechanism without using a (chip type) digital to analog converter (DAC). Thus, the accuracy of signal feedback is effectively improved and the overall circuit configuration of the power conversion apparatus is further simplified. In order to make this disclosure more comprehensible, several embodiments are described below as examples of implementation of this disclosure. Moreover, elements/components/steps with the same reference numerals are used to represent the same or similar parts in the drawings and embodiments where appropriate.

FIG. 1 is a schematic diagram illustrating a power conversion apparatus according to an embodiment of the invention. With reference to FIG. 1, a power conversion apparatus 100 includes a transformer 110, a switch 120, an analog controller 130, a digital controller 140, and a voltage converter-based feedback circuit 150.

The transformer 110 has a primary side NP and a secondary side NS, wherein the primary side NP of the transformer 110 is coupled to an input voltage VIN, and the secondary side NS of the transformer 110 is coupled to an output voltage VOUT that is provided to a load 10. The switch 120 is coupled between the input voltage VIN and the transformer 110 for configuring to intermittently transmit the input voltage VIN to the primary side NP of the transformer 110 under control. The analog controller 130 is disposed at the primary side NP of the transformer 110 for configuring to control an operation of the switch 120 in response to an analog feedback signal S_FA outputted by the feedback circuit 150. The digital controller 140 is disposed at the secondary side NS of the transformer 110 for configuring to generate a digital feedback signal S_FD associated with an operation status of the load 10 (e.g., light load, intermediate load, and heavy load). The voltage converter-based feedback circuit 150 is coupled to the analog controller 130 and receives the digital feedback signal S_FD. In addition, the feedback circuit 150 is configured to convert the digital feedback signal S_FD to the analog feedback signal S_FA according to a voltage conversion characteristic thereof.

Under the configuration of the power conversion apparatus 100 of this embodiment, the switch 120 may be a power switch included in a power factor correction (PFC) circuit or a pulse-width modulation (PWM) control circuit, for example. However, it should be noted that the invention is not limited thereto. That is to say, the voltage converter-based feedback circuit 150 of the embodiment of the invention is applicable to any power conversion apparatus that uses the configuration of the switch 120 for feedback control, so as to achieve the digital to analog conversion signal feedback mechanism without using a (chip type) digital to analog converter.

Moreover, although the analog controller 130 is disposed at the primary side NP of the transformer 110 while the digital controller 140 is disposed at the secondary side NS of the transformer 110 in this embodiment, the invention is not limited thereto. In another exemplary embodiment, the analog controller 130 and the digital controller 140 may be respectively disposed at the secondary side NS and the primary side NP of the transformer 110 according to the requirements of circuit design. In other words, the analog controller 130 of this embodiment may be disposed at one of the primary side NP and the secondary side NS of the transformer 110, and the digital controller 140 may be disposed at the other one of the primary side NP and the secondary side NS of the transformer 110.

Figure 2:
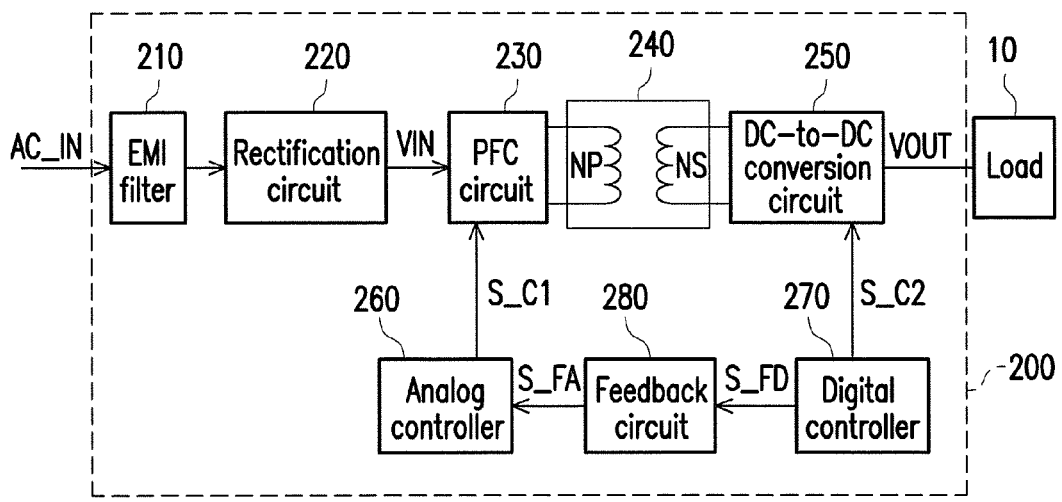
FIG. 2 is a schematic diagram illustrating the power conversion apparatus according to another embodiment of the invention.

Below a specific configuration of the power conversion apparatus of the embodiment of FIG. 1 is described with reference to FIG. 2 as an example. FIG. 2 is a schematic diagram illustrating the power conversion apparatus according to another embodiment of the invention. With reference to FIG. 2, a power conversion apparatus 200 includes an electromagnetic interference filter (EMI filter) 210, a rectification circuit 220, a power factor correction circuit 230, a transformer 240, a DC-to-DC conversion circuit 250, an analog controller 260, a digital controller 270, and a voltage converter-based feedback circuit 280.

In this embodiment, the electromagnetic interference filter 210 receives an AC voltage AC_IN (e.g., mains supply or city power, but not limited thereto) and is configured to suppress electromagnetic noise of the AC voltage AC_IN; and the rectification circuit 220 is configured to receive the AC voltage AC_IN after noise suppression and rectify the AC voltage AC_IN to generate the input voltage VIN.

An input end of the power factor correction circuit 230 is coupled to the rectification circuit 220 for configuring to perform power factor correction on the input voltage VIN associated with the AC voltage AC_IN and provide the input voltage after power factor correction to the primary side NP of the transformer 240. The transformer 240 induces a corresponding voltage at the secondary side NS based on the voltage at the primary side NP (i.e., the input voltage VIN after power factor correction) and provides the induced voltage to the DC-to-DC conversion circuit 250. The DC-to-DC conversion circuit 250 performs power conversion (e.g., buck conversion, boost conversion, or buck-boost conversion, but not limited thereto) in response to the voltage induced at the secondary side NS of the transformer 240, so as to generate the DC output voltage VOUT to be used by the load 10.

More specifically, operations of the power factor correction circuit 230 and the DC-to-DC conversion circuit 250 are respectively controlled by control signals S_C1 and S_C2 provided by the analog controller 260 and the digital controller 270 respectively. In addition to controlling the operation of the DC-to-DC conversion circuit 250, the digital controller 270 further detects the operation status of the load 10 and provides operation status information of the load 10 to the analog controller 260 through the feedback circuit 280 coupled between the digital controller 270 and the analog controller 260, such that the analog controller 260 adjusts the provided control signal S_C1 accordingly to adjust the output of the power factor correction circuit 230 in response to the operation status of the load 10. Here, the control signals S_C1 and S_C2 may be pulse-width modulation control signals, for example, wherein the analog controller 260 and the digital controller 270 adjust duty cycles of the control signals S_C1 and S_C2 to control the ON/OFF states of switches (not shown; e.g., 120) disposed in the power factor correction circuit 230 and the DC-to-DC conversion circuit 250, thereby adjusting the outputs of the power factor correction circuit 230 and the DC-to-DC conversion circuit 250 correspondingly.

In this embodiment, the digital controller 270 sends the digital feedback signal S_FD that indicates the operation status of the load 10 back to the voltage converter-based feedback circuit 280, such that the feedback circuit 280 converts the digital feedback signal S_FD received from the digital controller 270 to the analog feedback signal S_FA according to the voltage conversion characteristic thereof (i.e., the output voltage is equal to a product of the duty cycle and the input voltage) and provides the analog feedback signal S_FA to the analog controller 260 to serve as a basis for controlling the power factor correction circuit 230.

More specifically, the voltage converter-based feedback circuit 280 of this embodiment uses the digital feedback signal S_FD as the control signal of a power switch thereof (not shown; a specific configuration thereof is explained in the subsequent embodiment), so as to perform voltage conversion on a reference voltage in response to the digital feedback signal S_FD.

Take a buck converting voltage converter as an example (i.e., buck converter, but the invention is not limited thereto), because of the characteristic that the output voltage of the buck converter has a voltage level which is equal to a voltage level of the input voltage (i.e., the reference voltage) multiplied by the duty cycle of the control signal (i.e., the digital feedback signal S_FD) (Vout=Duty×Vin, wherein Vout: output voltage, Duty: duty cycle, and Vin: input voltage), if the reference voltage is a fixed value, the voltage level of the analog feedback signal S_FA generated by the feedback circuit 280 has a specific relationship with the duty cycle of the digital feedback signal S_FD. That is, in this embodiment, the voltage converter-based feedback circuit 280 determines the voltage level of the analog feedback signal S_FA according to the product of the duty cycle of the digital feedback signal S_FD and the reference voltage.

Thus, with the design of the voltage converter-based feedback circuit 280, the power conversion apparatus 200 of this embodiment is capable of converting the digital feedback signal S_FD that indicates the operation status of the load 10 to the analog feedback signal S_FA without using a (chip type) digital to analog converter. In comparison with the conventional power conversion configuration that uses a (chip type) digital to analog converter as the feedback circuit, the feedback circuit 280 of this embodiment achieves the function of digital to analog conversion without the (chip type) digital to analog converter and thus effectively reduces the design complexity thereof. With the digital to analog conversion of the feedback circuit 280, because the duty cycle of the digital feedback signal S_FD is converted to the voltage level of the analog feedback signal S_FA in the same proportion, there is less distortion in comparison with the case of using a general (chip type) digital to analog converter. In other words, the analog feedback signal S_FA indicates the operation status of the load 10 more accurately.

Figure 3:
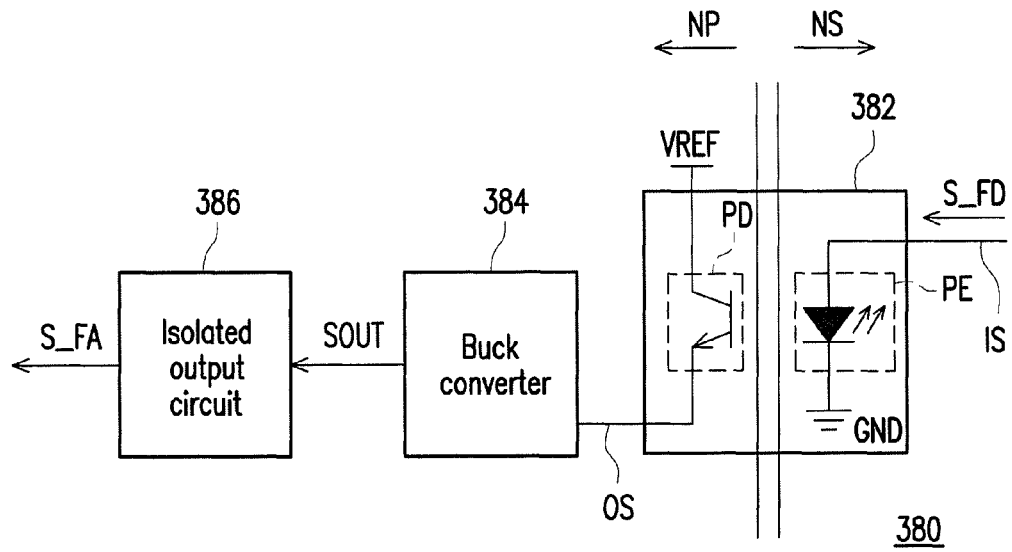
FIG. 3 is a schematic diagram illustrating a feedback circuit according to an embodiment of the invention.

In order to more clearly explain the specific configuration and operation of the feedback circuit according to the embodiment of the invention, FIG. 3 illustrates a feedback circuit 380 as an example below. FIG. 3 is a schematic diagram illustrating a feedback circuit according to an embodiment of the invention.

With reference to FIG. 3, in this embodiment, the voltage converter-based feedback circuit 380 includes a photo-coupler 382, a voltage converter 384 (which is also a buck converter, for example), and an isolated output circuit 386. The photo-coupler 382 has an input side IS and an output side OS, wherein the input side IS of the photo-coupler 382 is coupled to the digital controller (e.g., 140 or 270) at the secondary side NS to receive the digital feedback signal S_FD. The voltage converter 384 is coupled to the output side OS of the photo-coupler 382 for configuring to perform voltage conversion (referring to buck conversion here) on a reference voltage VREF according to the digital feedback signal S_FD coupled to the output side OS and generate an analog output signal SOUT accordingly. The isolated output circuit 386 is coupled between the voltage converter 384 and the analog controller (e.g., 130 or 260) at the primary side NP and configured to provide the analog feedback signal S_FA to the analog controller according to the analog output signal SOUT received from the voltage converter 384.

To be more specific, the photo-coupler 382 includes a light emitting device PE and a light detecting device PD, wherein the light emitting device PE emits a corresponding light signal in response to the digital feedback signal S_FD, and the light detecting device PD detects the light signal emitted by the light emitting device PE and converts the light signal to a corresponding electrical signal. In this embodiment, an end of the light detecting device PD receives the reference voltage VREF and the other end of the light detecting device PD is coupled to the input end of the voltage converter 384. The light detecting device PD is turned on or off in response to the light signal associated with the digital feedback signal S_FD, so as to provide the reference voltage VREF to the voltage converter 384 in a switchable/intermittent manner.

It is known from the above that, in this embodiment, the light detecting device PD of the photo-coupler 382 is deemed as the power switch of the voltage converter 384, wherein a resonant circuit (not shown) in the voltage converter 384 is charged/discharged in response to the state of the light detecting device PD (controlled by the digital feedback signal S_FD for turning on or off), so as to perform the operation of voltage conversion/buck conversion on the reference voltage VREF.

That is, for the voltage converter 384, the input voltage (Vin) is equivalent to the reference voltage VREF, and the control signal of the voltage conversion/buck conversion is equivalent to the digital feedback signal S_FD. Therefore, the voltage level of the analog output signal SOUT generated by the voltage converter 384 is determined according to the reference voltage VREF and the duty cycle of the digital feedback signal S_FD, which conforms to the characteristic of Vout=Duty×Vin.

Below FIG. 4 to FIG. 6 further illustrate specific embodiments of the feedback circuit of the invention.

Figure 4:
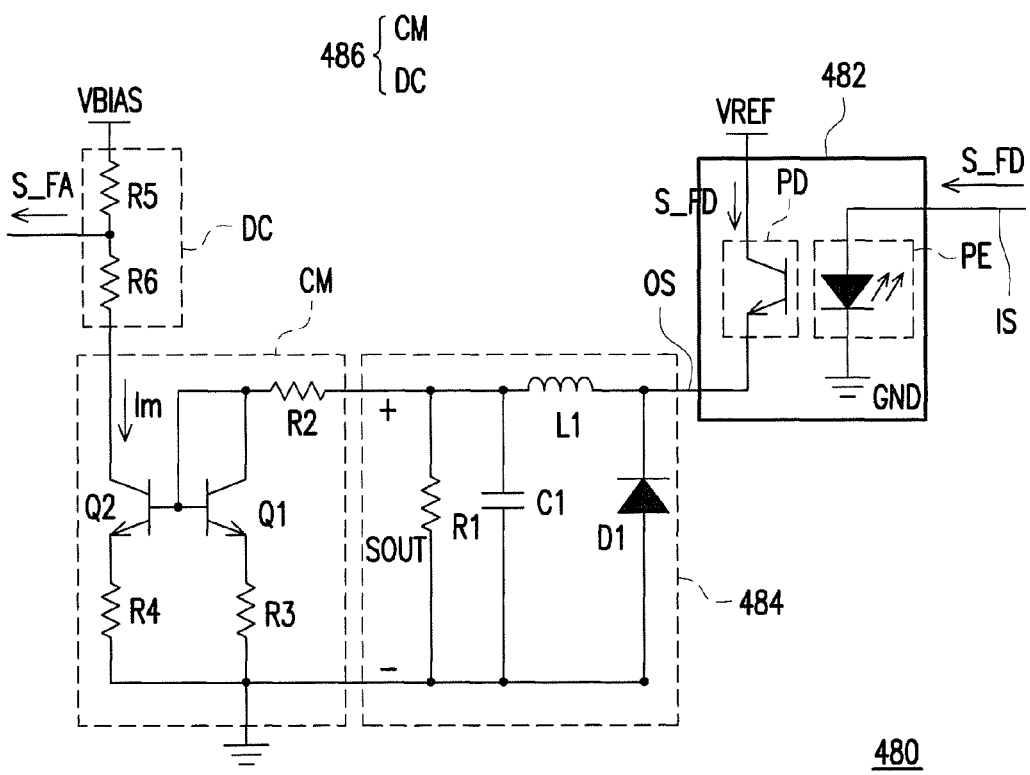
FIG. 4 is a schematic diagram illustrating a circuit architecture of the feedback circuit according to an embodiment of FIG. 3.

First, with reference to FIG. 4, FIG. 4 is a schematic diagram illustrating a circuit architecture of the feedback circuit according to an embodiment of FIG. 3. In this embodiment, a feedback circuit 480 includes a photo-coupler 482, a voltage converter 484, and an isolated output circuit 486.

The photo-coupler 482 receives the digital feedback signal S_FD from the digital controller (e.g., 140 or 270) through the input side IS (an anode end of the light emitting device PE) and provides the reference voltage VREF to the voltage converter 484 through the output side OS in response to the digital feedback signal S_FD in a switchable manner.

Here, the voltage converter 484 has a buck conversion circuit configuration, composed of a diode D1, an inductor L1, a capacitor C1, and a resistor R1, for example (however, the invention is not limited thereto; and a voltage converter having other circuit topology structures (including buck conversion, boost conversion, or buck-boost conversion) is also applicable). A cathode end of the diode D1 is coupled to the second end of the light detecting device PD and an anode end of the diode D1 is coupled to a ground end GND. A first end of the inductor L1 is coupled to the cathode end of the diode D1. A first end of the capacitor C1 is coupled to a second end of the inductor L1 and a second end of the capacitor C1 is coupled to the ground end GND. A first end of the resistor R1 is coupled to the second end of the inductor L1 and the first end of the capacitor C1, and a second end of the resistor R1 is coupled to the ground end GND. With this configuration, the inductor L1 and the capacitor C1 constitute a resonant tank and perform a charging/discharging operation in response to the reference voltage VREF that is outputted in a switchable manner, so as to establish an output voltage (i.e., the analog output signal SOUT) at two ends of the capacitor C1 and the resistor R1.

The isolated output circuit 486 includes a current mirror CM and a dividing circuit DC, wherein the current mirror CM is coupled to the output end of the voltage converter 484 and generates a mirror current Im in response to the analog output signal SOUT outputted by the voltage converter 484; and the dividing circuit DC is coupled to the current mirror CM to generate the analog feedback signal S_FA according to the mirror current Im.

In this embodiment, the current mirror CM has a circuit configuration composed of resistors R2-R4 and transistors Q1 and Q2, for example (however, the invention is not limited thereto, and a current mirror circuit having other circuit topology structures is also applicable). Here, the transistors Q1 and Q2 are npn type bipolar junction transistors (BJTs), for example. However, the transistors Q1 and Q2 may also be implemented by using pnp type BJTs or MOS transistors. Nevertheless, the invention is not limited to the above. Moreover, the dividing circuit DC has a circuit configuration composed of resistors R5 and R6, for example (the invention is not limited thereto, either).

More specifically, in the current mirror CM, a first end of the resistor R2 is coupled to the output end of the voltage converter 484 (a common node of the capacitor C1, the inductor L1, and the resistor R1). A base and a collector of the transistor Q1 are coupled to a second end of the resistor R2. A base of the transistor Q2 is coupled to the base of the transistor Q1. First ends of the resistors R3 and R4 are respectively coupled to emitters of the transistors Q1 and Q2, and second ends of the resistors R3 and R4 are coupled to the ground end GND.

In the dividing circuit DC, a first end of the resistor R5 receives a bias voltage VBIAS, and a second end of the resistor R5 is coupled to the analog controller. A first end of the resistor R6 is coupled to the second end of the resistor R5, and a second end of the resistor R6 is coupled to a collector of the transistor Q2.

Based on the aforementioned circuit configuration, the current mirror CM generates the corresponding mirror current Im in response to the analog output signal SOUT, such that the dividing circuit DC generates the analog feedback signal S_FA on a dividing point thereof (a common node of the resistors R5 and R6) based on the mirror current Im.

To be more specific, with the configuration of the current mirror CM, the mirror current Im has a positive correlation with the voltage level of the analog output signal SOUT outputted by the voltage converter 484. That is, as the voltage level of the analog output signal SOUT increases, the mirror current Im increases. On the other hand, the bias voltage VBIAS received by the dividing circuit DC is a fixed voltage. Therefore, the voltage on the dividing point of the dividing circuit DC has a negative correlation with the mirror current Im. That is, as the mirror current Im increases, the voltage on the dividing point decreases (because the increase of the mirror current Im increases the voltage drop caused by the resistor R5). In other words, the mirror current Im and the voltage level of the analog feedback signal S_FA have a negative correlation. As a result, the voltage level variation between the analog output signal SOUT and the analog feedback signal S_FA also shows a negative correlation.

It is known from the above that, in this embodiment, as the duty cycle of the digital feedback signal S_FD increases, the voltage level of the analog output signal SOUT outputted by the voltage converter 484 decreases. Thus, the duty cycle of the digital feedback signal S_FD and the voltage level of the analog feedback signal S_FA have a positive relationship/ positive correlation.

Figure 5:
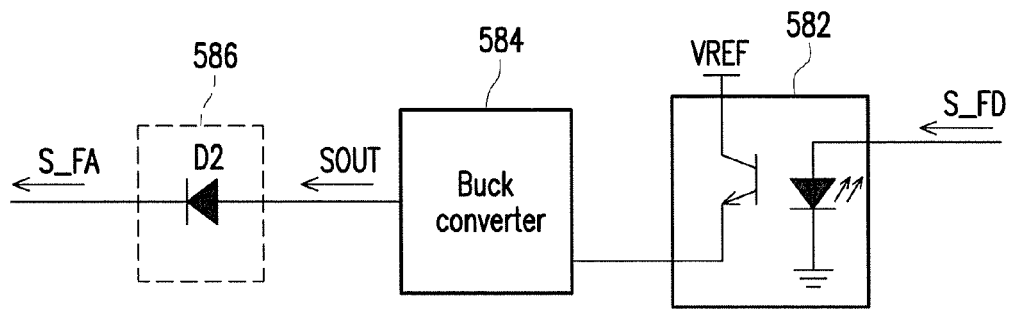
FIG. 5 is a schematic diagram illustrating the circuit architecture of the feedback circuit according to another embodiment of FIG. 3.

With reference to FIG. 5, FIG. 5 is a schematic diagram illustrating the circuit architecture of the feedback circuit according to another embodiment of FIG. 3. In this embodiment, a feedback circuit 580 also includes a photo-coupler 582, a voltage converter 584, and an isolated output circuit 586, wherein the overall configuration and operation of the photo-coupler 582 and the voltage converter 584 are the same as those specified in the embodiment of FIG. 3 and thus are not repeated hereinafter.

More specifically, a main difference between this embodiment and the embodiment of FIG. 4 lies in that the circuit configuration of the isolated output circuit 586 is implemented using a diode D2. An anode end of the diode D2 is coupled to the output end of the voltage converter 584 to receive the analog output signal SOUT, and a cathode end of the diode D2 is coupled to the analog controller to provide the analog feedback signal S_FA. Accordingly, the isolated output circuit 586 of this embodiment uses the analog output signal SOUT as the analog feedback signal S_FA, wherein the diode D2 is mainly used for isolating the analog controller and the voltage converter 584, so as to prevent the analog controller from causing any unexpected influence to the voltage conversion operation of the voltage converter 584.

Figure 6:
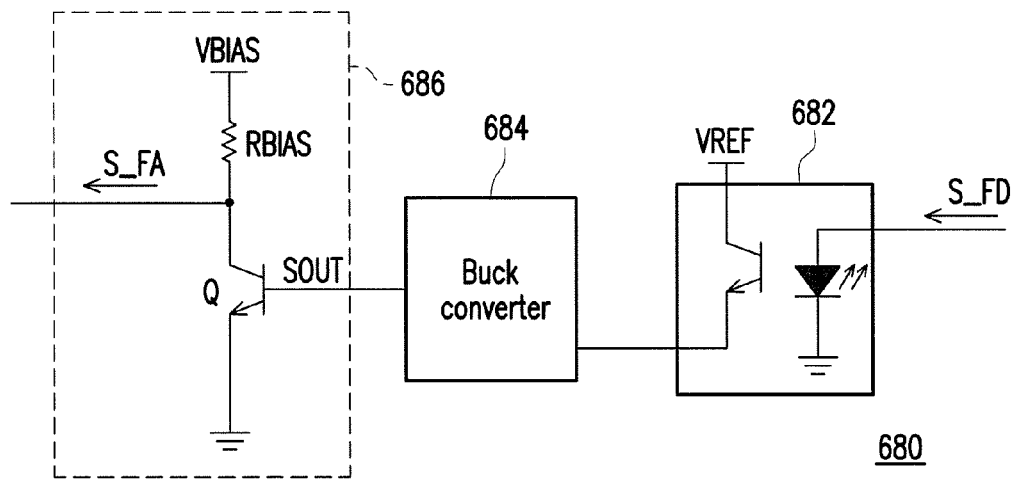
FIG. 6 is a schematic diagram illustrating the circuit architecture of the feedback circuit according to yet another embodiment of FIG. 3.

With reference to FIG. 6, FIG. 6 is a schematic diagram illustrating the circuit architecture of the feedback circuit according to yet another embodiment of FIG. 3. In this embodiment, a feedback circuit 680 also includes a photo-coupler 682, a voltage converter 684, and an isolated output circuit 686, wherein the overall configuration and operation of the photo-coupler 682 and the voltage converter 684 are the same as those specified in the embodiment of FIG. 4 and thus are not repeated hereinafter.

More specifically, a main difference between this embodiment and the embodiment of FIG. 4 or FIG. 5 lies in that the circuit configuration of the isolated output circuit 686 is implemented by a configuration composed of a bias resistor RBIAS and a transistor Q. A first end of the bias resistor RBIAS receives the bias voltage VBIAS. A base of the transistor Q is coupled to the output end of the voltage converter 684 to receive the analog output signal SOUT, a collector of the transistor Q is coupled to the analog controller and a second end of the bias resistor RBIAS to provide the analog feedback signal S_FA, and an emitter of the transistor Q is coupled to the ground end GND. Accordingly, the transistor Q changes the degree of conduction thereof according to the voltage level of the analog output signal SOUT and thereby generates a corresponding bias current, so as to cause the bias resistor RBIAS to generate the corresponding voltage drop and establish the analog feedback signal S_FA at the collector of the transistor Q. It is worth mentioning that, although the transistor Q of this embodiment is an npn type BJT, for example, the transistor Q may also be implemented by using a pnp type BJT or a MOS transistor. Nevertheless, the invention is not limited thereto.

In conclusion, the power conversion apparatus provided by the embodiments of the invention utilizes the voltage conversion characteristic of the feedback circuit to convert the digital feedback signal, generated by the digital controller at the secondary side and associated with the load operation status, to the corresponding analog feedback signal and provide the same to the analog controller at the primary side, such that the analog controller can control the power factor correction circuit based on the analog feedback signal. With this configuration, the digital to analog conversion of the feedback signal is achieved without using a (chip type) digital to analog converter. Therefore, the accuracy of signal feedback is effectively improved and the overall circuit configuration of the power conversion apparatus is further simplified.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power conversion apparatus, comprising:
 a transformer comprising a primary side and a secondary side, wherein the primary side is coupled to an input voltage and the secondary side is coupled to an output voltage that is provided to a load;
 a switch configured to intermittently transmit the input voltage to the primary side;
 an analog controller disposed at one of the primary side and the secondary side and coupled to the switch to control an operation of the switch in response to an analog feedback signal;
 a digital controller disposed at the other one of the primary side and the secondary side and configured to generate a digital feedback signal;
 a voltage converter-based feedback circuit coupled to the analog controller and having a voltage conversion characteristic, wherein the voltage converter-based feedback circuit receives the digital feedback signal and converts the digital feedback signal to the analog feedback signal according to the voltage conversion characteristic;
 an electromagnetic interference filter receiving an AC voltage and configured to suppress electromagnetic noise of the AC voltage;
 a rectification circuit coupled to the electromagnetic interference filter and configured to rectify the AC voltage after noise suppression to generate the input voltage; and
 a power factor correction circuit configured to perform a power factor correction on the input voltage associated with the AC voltage, wherein the switch is disposed in the power factor correction circuit to control an operation of the power factor correction circuit.

2. The power conversion apparatus according to claim 1, wherein the voltage converter-based feedback circuit determines a voltage level of the analog feedback signal according to a product of a duty cycle of the digital feedback signal and a reference voltage.

3. The power conversion apparatus according to claim 1, wherein the voltage converter-based feedback circuit comprises:
- a photo-coupler comprising an input side and an output side, wherein the input side is coupled to the digital controller to receive the digital feedback signal;
- a voltage converter coupled to the output side to perform a voltage conversion on a reference voltage according to the digital feedback signal coupled to the output side and generate an analog output signal accordingly; and
- an isolated output circuit coupled between the voltage converter and the analog controller to provide the analog feedback signal to the analog controller according to the analog output signal.

4. The power conversion apparatus according to claim 3, wherein the voltage converter comprises:
- a first diode comprising a cathode end and an anode end, wherein the cathode end of the first diode is coupled to the output side and the anode end of the first diode is coupled to a ground end;
- an inductor comprising a first end coupled to the cathode end of the first diode;
- a capacitor comprising a first end and a second end, wherein the first end of the capacitor is coupled to a second end of the inductor and the second end of the capacitor is coupled to the ground end; and
- a first resistor comprising a first end and a second end, wherein the first end of the first resistor is coupled to the second end of the inductor and the first end of the capacitor, and the second end of the first resistor is coupled to the ground end.

5. The power conversion apparatus according to claim 3, wherein the isolated output circuit comprises:
- a second diode comprising an anode end and a cathode end, wherein the anode end of the second diode is coupled to an output end of the voltage converter to receive the analog output signal, and the cathode end of the second diode is coupled to the analog controller to provide the analog feedback signal.

6. The power conversion apparatus according to claim 3, wherein the isolated output circuit comprises:
- a bias resistor comprising a first end to receive a bias voltage; and
- a transistor comprising a control end, a first end and a second end, wherein the control end of the transistor coupled to the output end of the voltage converter to receive the analog output signal, a first end of the transistor coupled to the analog controller and a second end of the bias resistor to provide the analog feedback signal, and a second end of the transistor coupled to a ground end.

7. The power conversion apparatus according to claim 3, wherein the isolated output circuit comprises:
- a current mirror coupled to the output end of the voltage converter and generating a mirror current in response to the analog output signal; and
- a dividing circuit coupled to the current mirror to generate the analog feedback signal according to the mirror current.

8. The power conversion apparatus according to claim 7, wherein the mirror current and a voltage level of the analog output signal have a positive correlation, and the mirror current and a voltage level of the analog feedback signal have a negative correlation.

9. The power conversion apparatus according to claim 7, wherein the current mirror comprises:
- a second resistor comprising a first end coupled to the output end of the voltage converter;
- a first transistor comprising a control end and a first end both coupled to a second end of the second resistor;
- a second transistor comprising a control end and a first end, wherein the control end of the second transistor is coupled to the control end of the first transistor and the first end of the second transistor is coupled to the dividing circuit;
- a third resistor comprising a first end and a second end, wherein the first end of the third resistor is coupled to a second end of the first transistor and the second end of the third resistor is coupled to a ground end; and
- a fourth resistor comprising a first end and a second end, wherein the first end of the fourth resistor is coupled to a second end of the second transistor and the second end of the fourth resistor is coupled to the ground end.

10. The power conversion apparatus according to claim 9, wherein the dividing circuit comprises:
- a fifth resistor comprising a first end and a second end, wherein the first end of the fifth resistor receives a bias voltage and the second end of the fifth resistor is coupled to the analog controller; and
- a sixth resistor comprising a first end and a second end, wherein the first end of the sixth resistor is coupled to the second end of the fifth resistor and the second end of the sixth resistor is coupled to the first end of the second transistor.

* * * * *